Figure 1:
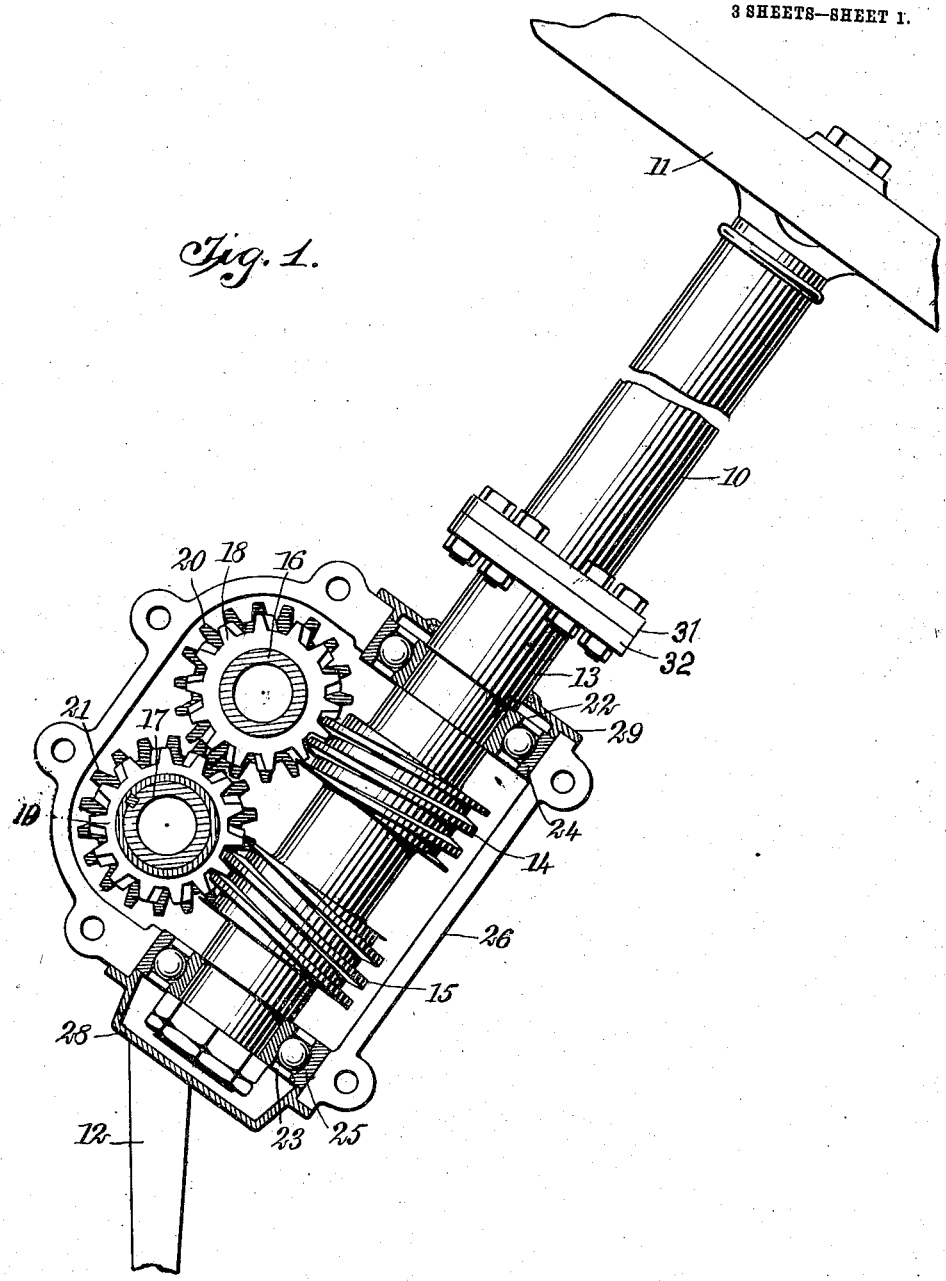

No. 873,526. PATENTED DEC. 10, 1907.
T. J. FAY & J. M. ELLSWORTH.
STEERING GEAR.
APPLICATION FILED MAY 18, 1

3 SHEETS—SHEET 1.

WITNESSES

INVENTORS
Thomas J. Fay
John Magee Ellsworth
BY
ATTORNEYS

No. 873,526. PATENTED DEC. 10, 1907.
T. J. FAY & J. M. ELLSWORTH.
STEERING GEAR.
APPLICATION FILED MAY 18, 1907.

3 SHEETS—SHEET 2.

WITNESSES

INVENTOR
Thomas J. Fay
John Magee Ellsworth
BY
ATTORNEYS

No. 873,526.  
PATENTED DEC. 10, 1907.  
T. J. FAY & J. M. ELLSWORTH.  
STEERING GEAR.  
APPLICATION FILED MAY 18, 1907.  
3 SHEETS—SHEET 3.
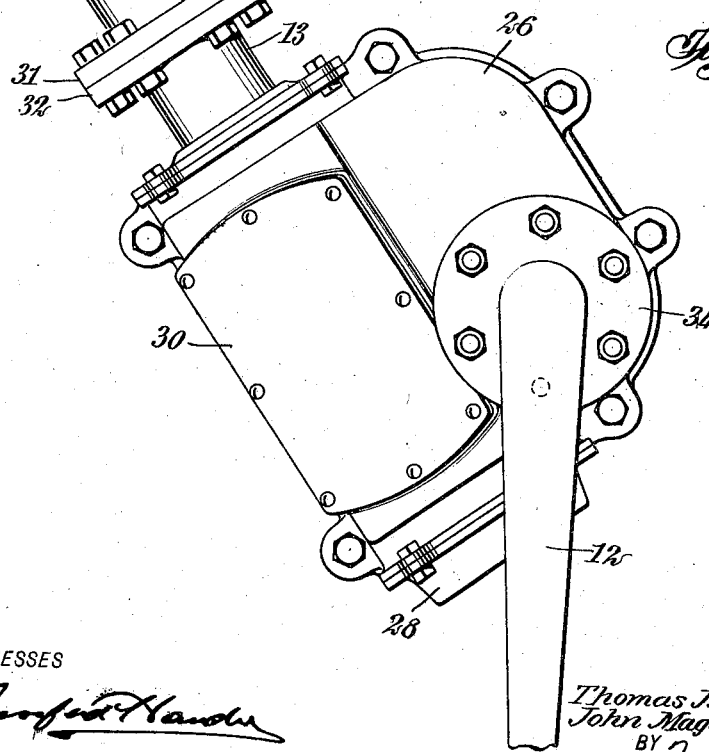

UNITED STATES PATENT OFFICE.

THOMAS J. FAY, OF NEW YORK, N. Y., AND JOHN MAGEE ELLSWORTH, OF BERNARDSVILLE, NEW JERSEY.

STEERING-GEAR.

No. 873,526.  Specification of Letters Patent.  Patented Dec. 10, 1907.

Application filed May 18, 1907. Serial No. 374,499.

*To all whom it may concern:*

Be it known that we, THOMAS J. FAY, a resident of the city of New York, borough of Brooklyn, in the county of Kings and State of New York, and JOHN MAGEE ELLSWORTH, a resident of Bernardsville, in the county of Somerset and State of New Jersey, both citizens of the United States, have invented a new and Improved Steering-Gear; of which the following is a full, clear, and exact description.

This invention relates to certain improvements in steering gears especially adapted for use upon motor vehicles, and relates more particularly to means for transmitting motion from the steering wheel to the oscillating arm operatively connected by suitable links to the steering knuckles. Our invention relates more particularly to that type of steering gear in which the steering column is provided with a worm intermeshing with a worm wheel upon a short shaft or pivot supporting the oscillating arm. In steering gears of this type great difficulty is experienced due to the wearing of the engaging portions of the worm and worm wheel, a very slight amount of wear permitting of lost motion and rendering it impossible to direct the course of the vehicle with any degree of accuracy. It is evident that those portions of the worm and worm gear which are in mesh when the vehicle is pursuing a substantially straight course, becomes worn to a greater extent than do the remaining portions of the worm and worm wheel. In order to bring new surfaces to bear, the position of the worm and worm wheel in respect to the steering column and the oscillating arm is sometimes adjusted, but this adjustment necessitates the work of an expert mechanic in removing the protecting casing, disassembling the gearing, making the desired changes in the position of the parts, and re-assembling to bring the steering wheel and the oscillating arm in exactly the original relative positions.

In our improved construction, the steering column is provided with a right-hand and a left-hand worm, both of which transmit motion to the shaft of the oscillating arm, one transmission being direct to the worm wheel on said shaft, and the other being through a worm wheel upon an auxiliary shaft adjacent and parallel to the first mentioned shaft, both of said shafts being provided with pinions or gear wheels which intermesh. By so constructing the device, the strain is distributed over a larger surface, and the consequent wear upon any one point is reduced to a corresponding extent, thus eliminating to a large degree the resulting lost motion. A more positive action is obtained during the normal operation, and even though a worm and a worm wheel or a gear wheel should break or loosen, the device would still continue to operate. The right-hand and left-hand worms on the steering column operate simultaneously and counteract each other to eliminate all end thrust on the column and thus permit of the use of simpler bearings for supporting said column. By distributing the strain upon the surfaces of two worms, it is possible to provide worms of much higher pitch than were the entire strain borne by one worm as in the construction commonly employed.

To permit new faces of the worms and worm wheels to be brought into engagement, we construct the steering column in two parts, one of which comprises that portion having the worms thereon and extending a short distance out of the casing, and the other portion comprises the remainder of the column. The meeting ends of the two portions are provided with flanges adapted to be bolted together, and the oscillating arm is also provided with a flange, whereby it may be bolted to the flanged end of its supporting shaft. The bolt holes are equally spaced and the number of bolts employed for securing the portions of the steering column together, is exactly the same as or a divisor of the number of the bolts employed to secure the oscillating arm to its shaft. The worm wheel and worm are so designed that the steering column and shaft may rotate through the same angular distance in the same time, or the rates of rotation may be graded to any desired ratio, it being only essential that when the arm-supporting shaft is unbolted and rotated through an angular distance between bolt holes, the lower portion of the steering column will be rotated through such a distance that the bolt holes will come into perfect alinement and permit of the column being re-bolted without having affected the adjustment of the column in respect to the arm. By so constructing the device, we are able to bring new and unworn faces of the worm and worm wheel into engagement and thus practically provide new gearing with a minimum amount of labor. All that is necessary is to remove the bolts by which the parts of the steering column are held together, and remove the bolts by which the oscillating arm is held in place, and by then rotating the arm-supporting shaft within the casing through a portion of a revolution equivalent to the distance between the bolt holes in the flanges, new holes are brought into alinement at both places. The parts are then bolted together again and the entire gearing will be found to be in perfect adjustment. It is entirely unnecessary to remove the gear casing to bring the new faces into operative engagement. No expert ability is required to unbolt and bolt up again the parts, and as the bolt holes are properly spaced, the adjustment of the steering column and oscillating arm is not affected.

The invention consists in certain features of construction and combinations of parts, all of which will be fully set forth hereinafter and particularly pointed out in the claims.

Figure 2:
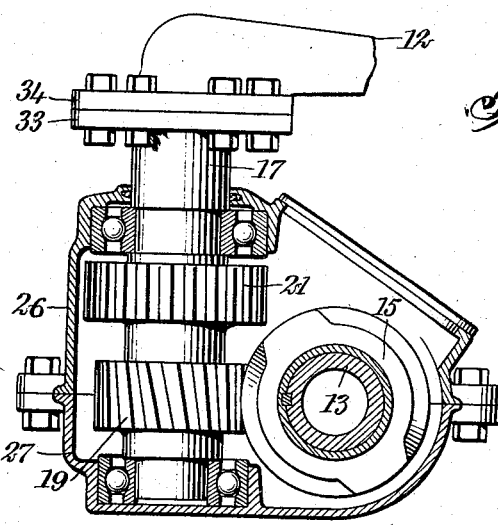
Figure 3:
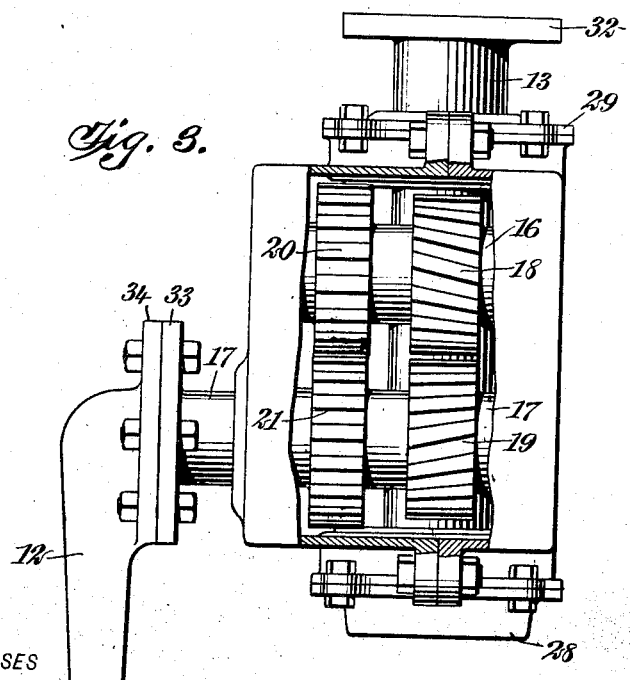

Reference is to be had to the accompanying drawings, forming a part of this specification, in which similar characters of reference indicate corresponding parts in all the figures, and in which Figure 1 is a side elevation of a steering gear constructed in accordance with our invention; Fig. 2 is a top plan view, the steering column and casing being shown in section; Fig. 3 is a view taken in a plane parallel to the steering column, a portion of the casing being broken away; Fig. 4 is a view similar to Fig. 2, but showing the closed casing and flange of the steering column; and Fig. 5 is a view looking in the opposite direction to the view illustrated in Fig. 1, and showing the flange of the oscillating arm.

In the specific embodiment of our invention illustrated in the accompanying drawings, we provide a steering column 10, having a steering wheel 11, and provide means whereby motion is imparted to the oscillating arm 12 by the rotation of the steering column. The lower end of the arm is connected to any suitable form of mechanism, whereby upon the backward or forward movement of the arm, the front wheels of the vehicle are moved to the right or left to guide said vehicle in the desired direction. Gearing forming an important portion of our invention, connects the lower end of the column to the shaft to which the arm is secured, and this gearing is inclosed within a suitable casing to protect the same against injury from contact with dust and foreign bodies. As illustrated, the steering column is formed of two portions, the lower portion 13 of which extends into the protecting casing and is provided with two worms 14 and 15, one of which is a right-hand worm and the other a left-hand worm, and both worms are preferably of exactly the same pitch. Journaled in the walls of the casing and adjacent the column are provided two shafts 16 and 17, both ends of one of which terminate within the casing, while one end of the other extends outward through the casing and is bolted to the oscillating arm 12. Both of the shafts are driven simultaneously by worm wheels 18 and 19 mounted upon the shafts and in engagement with the two worms 14 and 15. Adjacent the two worm wheels are two intermeshing gear wheels 20 and 21 of exactly the same size and keyed or otherwise rigidly secured to the two shafts 16 and 17. By the rotation of the steering column, the two worms 14 and 15 are rotated to rotate the two worm wheels and the two shafts in opposite directions, and the gear wheels 20 and 21 upon these shafts also cause the two shafts to rotate together and take up the excess of lost motion, should there be a greater amount of lost motion in the engagement of one of the worms with its worm wheel than in the engagement of the other worm with its worm wheel.

The shaft 17 is, properly speaking, the driven shaft, as the arm is rigidly secured thereto, and the gearing above described serves to transmit motion from the steering column or driving shaft directly to the driven shaft through the instrumentality of the worm 15 and worm wheel 19, while the motion is indirectly but also positively transmitted through the worm 14, worm wheel 18, shaft 16, and gears 20 and 21. In case any one of the worms, worm wheels, or gear wheels should break or loosen, the motion of the steering column would still be imparted to the arm 12, and the operation of the device would not be materially interfered with. The worms may be of any pitch desired, but as illustrated, each worm is provided with two threads and each worm wheel with fourteen teeth; thus a rotation of the steering column through seven degrees causes a rotation of the arm-supporting shaft 17 through one degree. As the worms counteract each other in the production of end thrust, any suitable bearings may be provided for the steering column. As shown, the column is provided with race rings 22 and 23, serving to support rows of balls in engagement with the race rings 24 and 25 mounted in the walls of the casing. The two shafts are similarly supported within ball bearings, whereby the parts may rotate with the greatest freedom.

The casing as illustrated, is made up of a plurality of sections bolted together to thoroughly seal the gears against the admission of dust and dirt. The casing preferably comprises two oppositely disposed sections 26 and 27, each serving to support one end of each of the shafts 16 and 17, and jointly supporting the bearings for the lower portion 13 of the steering column. A cap 28 is preferably provided for closing the lower end of the casing, and a collar 29 surrounds the steering column at the point at which said column enters the casing. For permitting an inspection of the gearing and to permit the packing of the same with a lubricant, there is provided an inspection opening normally closed by a face plate 30 extending longitudinally of the casing, said plate being normally held in engagement with the casing by screws or other suitable means.

To permit of the bringing of new faces of the gears into engagement, the steering column is preferably formed of two sections rigidly secured together. As shown, one of these sections comprises the larger portion of the steering column, while the other section comprises that portion lying within the casing. The sections are provided with annular flanges 31 and 32 bolted together by a plurality of equally-spaced bolts. The shaft 17, which supports the arm, is provided with an annular flange 33 to which is rigidly bolted the flange 34 of the oscillating arm 12. The bolts by which these two flanges are secured together are equally spaced and are preferably the same in number as the bolts required for securing together the flanges 31 and 32 of the steering column. When those portions of the worms and worm wheels which are normally in engagement become worn to any appreciable extent, all that is necessary to bring new portions into engagement is to unbolt the flanges 31 and 32 and the flanges 33 and 34, and by holding the arm 12 stationary, the shaft 17 may be rotated to bring each bolt hole of one flange into engagement with the next succeeding bolt hole of the other flange.

With the worm and worm gear proportioned as illustrated in the drawings, and with each pair of flanges secured together by six bolts, a rotation of the shaft 17 through the angular distance of one bolt hole, namely, 60 degrees, rotates the lower portion 13 of the steering column through seven times as great an angular distance; or, in other words, through one and one-sixth revolutions. As the angular distance between the bolt holes in the flanges 31 and 32 is also 60 degrees, it will be noted that the rotation of the shaft 17 through one-sixth of a revolution, brings the bolt holes of the flanges 31 and 32 into perfect alinement. The parts may be bolted together again and new faces on the worms, worm wheels and gear wheels will be in normal engagement, and the gearing will be fully as efficient as when first installed.

It will be noted that to effect this changing of the gear faces, the relative adjustment of the gears is unaffected, the casing is neither opened nor removed, and the relative adjustment of the steering column and arm 12 is not affected in the slightest. Furthermore, the operation above described does not require the services of a skilled mechanician.

Having thus described our invention, we claim as new and desire to secure by Letters Patent:

1. In combination, an operating member, a movable operated member, gearing connecting said members, and means whereby said gearing may be rotated to bring new faces thereof normally into mesh independently of said operating and operated members.

2. In combination, an operating member, a movable operated member, gearing connecting said members, said gearing including a worm and a worm wheel, and means whereby said gearing may be rotated to bring new faces thereof normally into mesh independently of said operating and operated members.

3. In combination, an operating member, a movable operated member, gearing connecting said members whereby one may be oscillated by the other, and means permitting the entire gearing to be moved to bring new surfaces of the gears into mesh without disturbing the normal relationship of the operating and operated members.

4. In combination, an operating member, a movable operated member, gearing connecting said members, whereby one may be oscillated by the other, said gearing including a worm and a worm wheel, and means permitting the entire gearing to be moved to bring new surfaces of the gears into mesh without disturbing the normal relationship of the operating and operated members.

5. In combination, a steering column, an oscillating arm, gearing connecting said column to said arm, and means permitting the gearing to be rotated to bring new surfaces into normal engagement without disturbing the relationship of the column and the arm.

6. In combination, a steering column, an oscillating arm, gearing connecting said column and arm, a casing inclosing said gearing, and means outside of the casing for permitting the gearing to be rotated to bring new surfaces of the gears into mesh without disturbing the relationship of the column and arm.

7. In combination, a steering column made up of a main body and a separable section, a gearing operatively connected to said section, an arm detachably secured to said gearing, whereby it is oscillated by the rotation of said column, and means permitting the gearing and separable section of the column to be rotated to bring new faces of the gears into mesh without disturbing the relationship between the main body of the column and the arm.

8. In combination, a steering column made up of a main body and a separable section, a gearing operatively connected to said section, said gearing including a worm and a worm wheel, an arm detachably secured to said gearing, whereby it is oscillated by the rotation of said column, and means permitting the gearing and separable section of the column to be rotated to bring new faces of the gears into mesh without disturbing the relationship between the main body of the column and the arm.

9. In combination, a steering column, including a main body portion and a separable section, said section and said body portion being provided with flanges adjacent their meeting ends, and said flanges having equally-spaced bolt holes, a worm upon said separable section, a worm shaft carrying a worm wheel in engagement with said worm, and an arm adapted to be connected to said worm shaft, said arm and said shaft being provided with flanges adjacent their meeting surfaces, and said flanges being provided with equally-spaced bolt holes, the arrangement being such that the gearing including the separable section of the column, the worm shaft, the worm, and the worm wheel, may be detached from the body of said column and said arm, rotated a predetermined distance to bring new faces of the worm and worm wheel normally into mesh, and rebolted to the body of the column and the arm without affecting the relative positions of the latter.

10. In combination, a steering column, a shaft, an arm carried thereby, means for transmitting rotary motion from said column to said shaft, and independent means for transmitting the same motion, said last-mentioned means including an oscillatory shaft operatively connected to both the column and the first-mentioned shaft by suitable sets of gears.

11. In combination, a steering column, an oscillatory arm, and means for transmitting motion from said column to said arm, said means including two shafts rotatable in opposite directions, means whereby both of said shafts receive motion from said column, and means whereby both of said shafts transmit motion to said arm.

12. In combination, an operating member, a movable operated member, gearing for transmitting motion from the former to the latter, and an auxiliary gearing for independently transmitting said motion, each of said gearings including a worm and a worm wheel, both of said worms being carried by the same member and having oppositely-directed threads whereby end thrust upon said last-mentioned member is eliminated.

13. In combination, a steering column and a shaft, the former comprising an operating member and the latter comprising an operated member, two worms upon one of said members and having oppositely-directed threads, and worm wheels in engagement with said worms, said pairs of worms and worm wheels serving to transmit motion to said shaft independently of each other.

14. In combination, an operating member, a movable operated member, gearing for transmitting motion from the former to the latter, and auxiliary gearing for independently transmitting said motion, each of said gearings including a worm and a worm wheel, said worms being carried by said operating member and having oppositely directed threads, whereby end thrust upon said operating member is eliminated.

15. In combination, a steering column, two worms carried thereby and having oppositely directed threads, worm wheels in engagement with said worms, an arm, and means whereby motion is imparted to said arm independently by each of said worm wheels.

16. In combination, a steering column, a shaft, an arm carried thereby, an auxiliary shaft substantially parallel to the first mentioned shaft, independent sets of worms and worm wheels for transmitting motion from said column to said shafts, and intermeshing gear wheels carried by said shafts.

In testimony whereof we have signed our names to this specification in the presence of two subscribing witnesses.

THOMAS J. FAY.
JOHN MAGEE ELLSWORTH.

Witnesses:
EVERARD B. MARSHALL,
CLAIR W. FAIRBANK.